C. O. CLÉMENTZ.
SIGHTING APPARATUS.
APPLICATION FILED FEB. 6, 1917.

1,324,729.

Patented Dec. 9, 1919.
8 SHEETS—SHEET 1.

Inventor
Carl Oscar Clémentz
By J. W. Imrie
Attorney

C. O. CLÉMENTZ.
SIGHTING APPARATUS.
APPLICATION FILED FEB. 6, 1917.

1,324,729.

Patented Dec. 9, 1919.
8 SHEETS—SHEET 3.

Inventor
Carl Oscar Clémentz
By
Attorney

C. O. CLÉMENTZ.
SIGHTING APPARATUS.
APPLICATION FILED FEB. 6, 1917.

1,324,729.

Patented Dec. 9, 1919.
8 SHEETS—SHEET 7.

Inventor
Carl Oscar Clémentz
By
Attorney

C. O. CLÉMENTZ.
SIGHTING APPARATUS.
APPLICATION FILED FEB. 6, 1917.

1,324,729.

Patented Dec. 9, 1919.
8 SHEETS—SHEET 8.

Inventor
Carl Oscar Clémentz

By
Attorney

UNITED STATES PATENT OFFICE.

CARL OSCAR CLÉMENTZ, OF MALMÖ, SWEDEN.

SIGHTING APPARATUS.

1,324,729.     Specification of Letters Patent.     Patented Dec. 9, 1919.

Application filed February 6, 1917. Serial No. 146,955.

*To all whom it may concern:*

Be it known that I, CARL OSCAR CLÉMENTZ, a citizen of Sweden, and resident of Malmö, Sweden, have made a new and useful Invention in Sighting Apparatus, of which the following is a specification.

This invention relates to an apparatus for determining the position and the speed of an object in the air and for indicating the pointing of firearms and the timing of their projectiles for the purpose of firing at said object. The apparatus consists of two different parts which are to be placed at two separate places.

One of these parts which hereinafter is referred to as the auxiliary apparatus consists of a sighting-instrument made to turn horizontally as well as vertically and provided with an indicator traveling over a graduated disk by means of which it is possible to read off the position of the sighting-instrument in the vertical plane on the stationary horizontal disk which is adjusted with its zero directed toward a certain point of the compass, as hereinafter is described in detail and particularly pointed out in the claims.

The other part of the apparatus, hereinafter referred to as the main-apparatus, consists of two different parts: (1) an indicator which is adjustable in relation to a disk arranged in the same way as that of the auxiliary apparatus in angular positions corresponding to the position of the indicator of the auxiliary apparatus, and (2) a vertical ranging-disk and a sighting-rule movable over said disk and made to turn together with the same around a vertical axle.

It is evident that various changes may be made in the construction and arrangement of the devices herein described without departing from the spirit of the invention which will be fully understood in the course of the following description, reference being had to the accompanying drawings, in which I have shown, by way of example, a preferred embodiment of the invention.

Figure 1 is an elevation of the main apparatus and the auxiliary apparatus. Fig. 2 is an enlarged elevation illustrating a form of the main-apparatus.

In Fig. 1 the main-apparatus is placed in the two points A and E while the auxiliary apparatus is placed in the point B. In this case for instance, it may be assumed that the distance A B=5 kilometers, the distance A E=5 decimeters. D indicates the object in the air, the location of which is to be determined, and $D_h$ is the horizontal projection of the object on the ground.

On the axle carrying the sighting-instrument 1 placed in B a horizontal indicator 2 is mounted in such a way that the center line of the sighting instrument and the indicator are exactly in the same vertical plane. Thus, if the sighting-instrument 1 is turned horizontally, the indicator 2 performs a circular movement in the horizontal plane, and if the sighting-instrument is directed toward the object D the indicator 2 at the same will point toward the horizontal projection $D_h$ of the object, and then the position of the indicator may be read off directly on a graduated disk 3 placed under the indicator, which disk should be placed so that its zero coincides with the straight line A B.

The main-apparatus consists, as mentioned above, of two different parts, which according to Fig. 1 are placed on separate stands or pedestals. It is however to be preferred for practical use to combine the two parts on one stand. One of these parts of the main-apparatus, viz., the vertical ranging disk 4 in the point A suitably consists of a quadrant pivoted around one of its edges which coincides with the vertical line through A while consequently the other side is horizontal. The other part of the main-apparatus consists of the indicator 5 placed at E in such a way that its center of rotation coincides exactly with the point E which also must be chosen so that it lies in the line A B. Besides the indicator 5 the apparatus placed in the point E also contains a graduated plate 6 arranged under the indicator by means of which the indicator can be given exactly the same position as the indicator 2 in the point B. For this purpose the zero of the plate 6 must correspond to the zero of the plate or disk 3. The indicator 5 should have at least the same length as the horizontal edge of the ranging-disk 4, and the distance between the points A and E is preferably shorter than the length of the indicator 5. The ranging-disk 4 is suspended in such a way that the indicator 5 can move freely under the same.

When the disk 4 is set in the vertical plane passing through the object D and the points A and $D_h$ by means of a sighting instrument 7 pivotally mounted on said disk, and the indicator 5 is given the same direction as the indicator 2 at the point B, it is obvious that the indicator 5 will fall directly under a certain point F on the ranging-disk 4. Thus the triangle inclosed between the points A and E and the point F will evidently be similar to the triangle A, B, $D_h$, and in these triangles the sides A B, A E and A F are known, on account of which the side A $D_h$, i. e. the horizontal distance between A and D may easily be determined. In order to make it easier to find the distance A F on the ranging-disk 4 this is furnished with vertical scale-lines 8, for each centimeter for instance, and for a similar reason it is also furnished with horizontal scale-lines 9.

Further the ranging-disk is fitted with a rule 10, which is also furnished with scale-lines and mounted pivotally in the point of intersection of the horizontal and the vertical edge of the ranging-disk, and the ranging-instrument 7 is suitably placed on the rule in such a way that this as well as the ranging-disk are adjustable by one and the same action. When in this way the rule has been directed toward the point D, and the indicator 5 is adjusted as before, there is no difficulty in determining the height of the object D above the horizontal plane as well as the distance of the same from the point A. If the point F is traced upward along the ranging-disk 4 until it meets the rule in the point G, one obtains two other similar triangles, viz., A, F, G and A, $D_h$, D, whose sides A F, A G, F G and A $D_h$ are known. Consequently the distance A D as well as D $D_h$ may easily be determined.

There are evidently certain positions in which the described apparatus does not function, viz., when the object D is in the vertical-plane through the points A and B. Further the determination will be rather uncertain in the vicinity of said plane. But this inconvenience may easily be avoided by mounting another auxiliary apparatus in another point at a distance from B, and by adjusting or directing the line A E toward this point. If the distance between A and B is changed, this, of course, must be taken into consideration in calculating, and in order to get a simple rate of scale it may be necessary to move the point E correspondingly.

Figure 3:
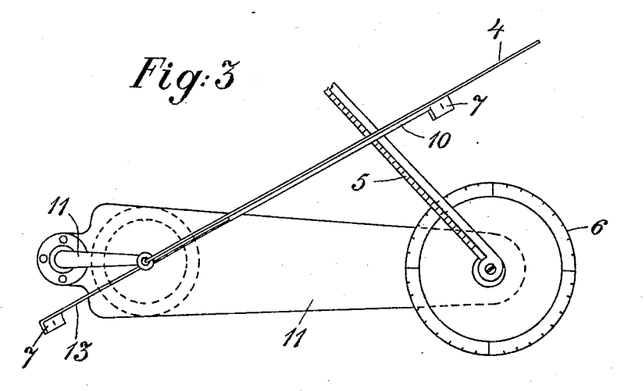
Fig. 3 is a plan view of the same.

According to Figs. 2 and 3 the ranging-disk 4 is vertically mounted on the stand 11. 5 designates the indicator pivotally mounted on the graduated disk 6, and 10 represents the graduated rule mounted on the pivot 12 which rule supports at its ends two sighting-plates 7, forming the sighting-instrument, by means of which the ranging-disk 4 as well as the rule may be directed as desired. For the purpose of facilitating this operation the rule 10 is furnished with a lengthening piece 13, at the end of which one of the sighting-plates is mounted.

Figures 4, 5:
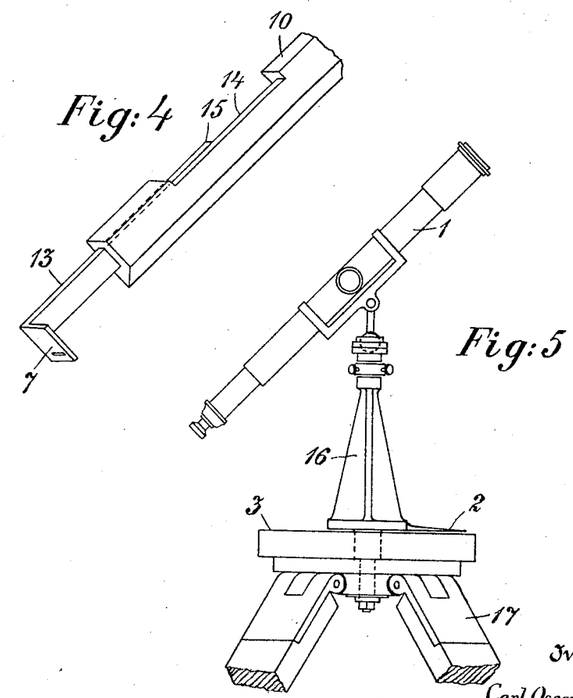
Fig. 4 illustrates a detail.
Fig. 5 is a side view showing the auxiliary apparatus.

In order to prevent the lengthening piece 13 from impeding the ranging-disk 4 when turning from one side to another this lengthening piece is made removable as shown in Fig. 4, the rule 10 being formed as a guide 14 at the end that is nearest to the pivot 12; the end 15 of the lengthening-piece is of a corresponding shape and made to slide in the guide.

The auxiliary apparatus is shown in Fig. 5 where 1 designates the ranging-instrument, made to turn vertically upon the holder 16, which is made to turn horizontally on the stand 17. The indicator 2 is connected with the holder 16 and through it with the ranging-instrument 1; the said indicator travels on the plate 3, mounted on the stand 17.

Figs. 6-11 illustrates the main-apparatus provided with some auxiliary-arrangements by means of which it will be possible to read off more exactly and to some extent automatically. The ranging-disk 4 is mounted vertically on the stand 11 in the same way as before. It is to be noticed that in practice the distance between the points A and E may be variable though this is not shown in the figure. In order to dispense with the vertical and horizontal lines 8 and 9 the ranging-disk 4 is provided with another graduated rule 18 which is movable parallel to the vertical edge of the ranging-disk along said disk.

Figures 6, 8:
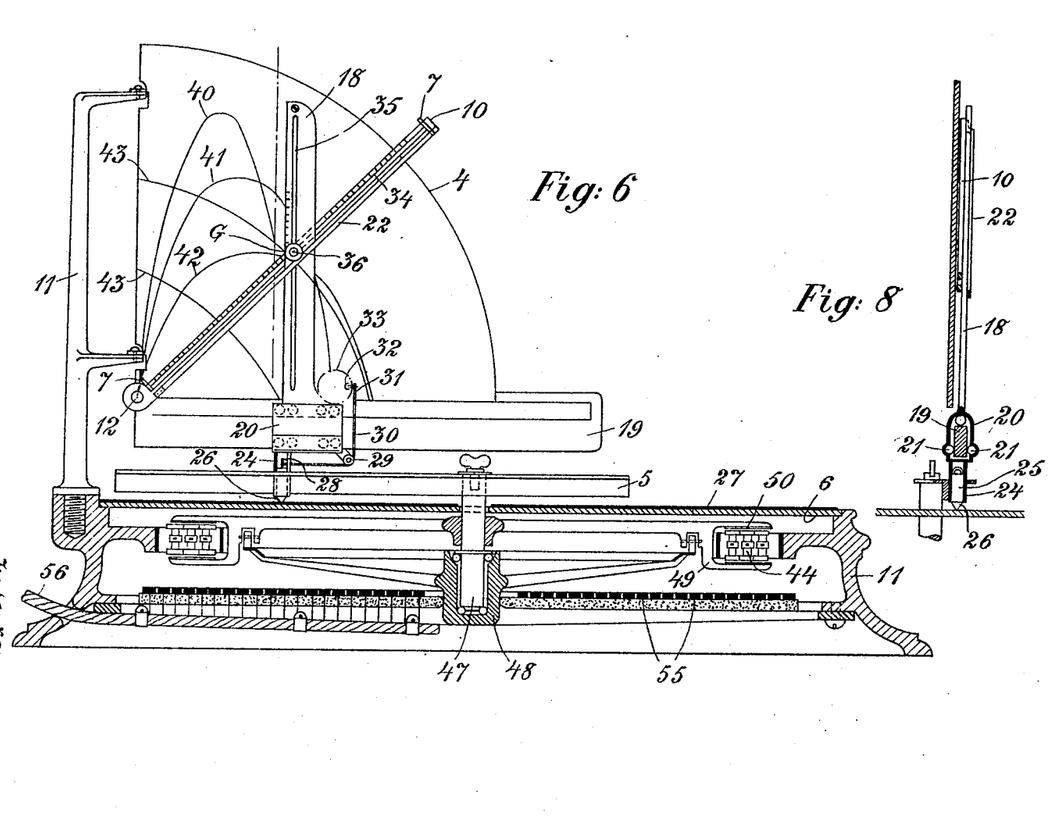
Fig. 6 is an elevation illustrating another form of the main-apparatus partly in section.
Fig. 8 is a vertical transverse section of Fig. 6.
Figure 7:
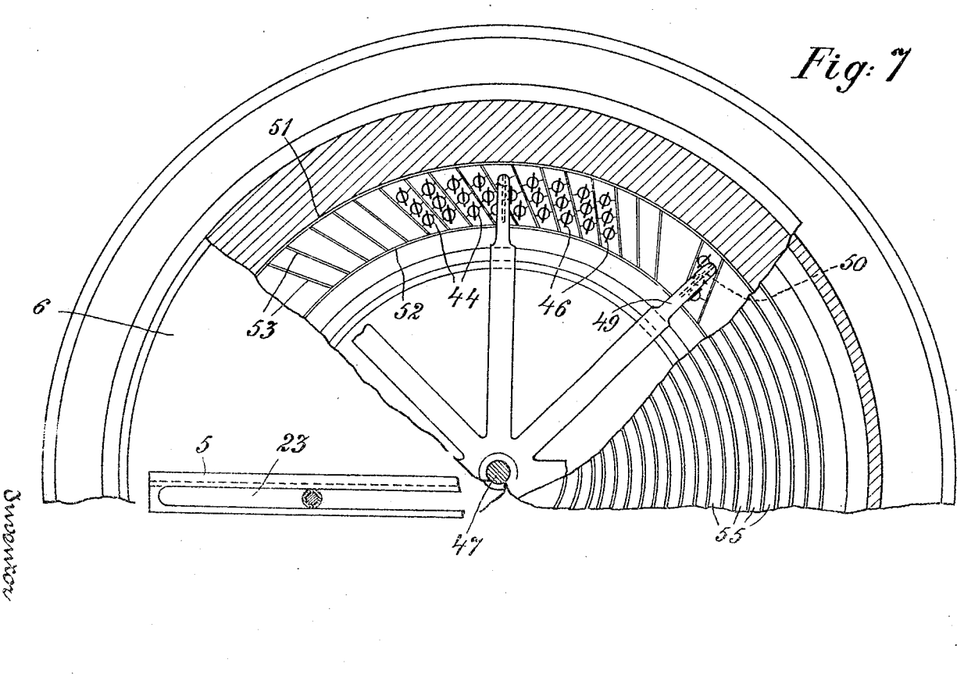
Fig. 7 is a partly sectional plan view of the same.
Figures 9, 10, 11, 17:
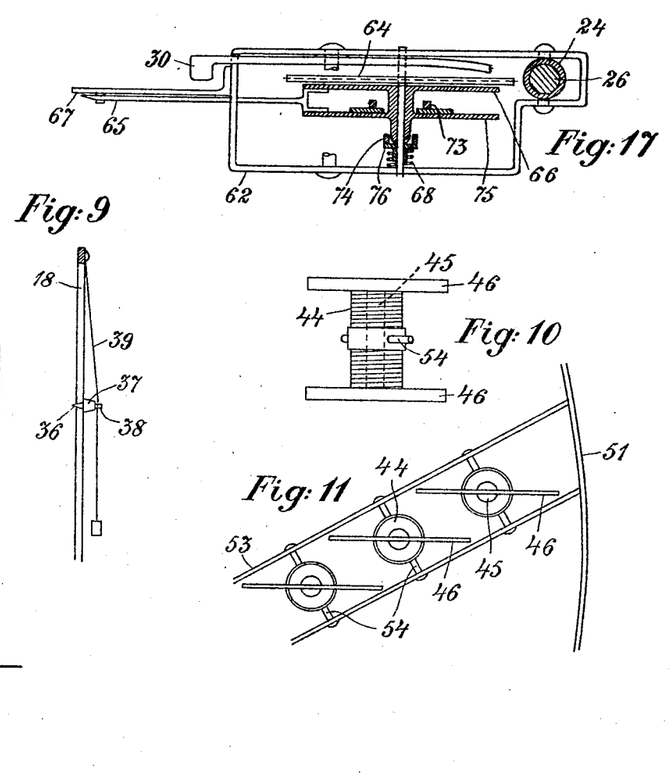
Figs. 9–11 show some details.
Figs. 15–17 are fragmentary views illustrating some details of said speed recorder.

Thus this rule transfers the point F (Fig. 1) automatically up to the rule 10, so that the point G is obtained quite exactly without vertical lines, and for the parallel displacement of the rule 18 the apparatus is provided with a rail 19 connected with the ranging-disk 4 along which rail the lower sleeve-shaped end 20 of the rule 18 slides on balls or rollers 21. To get the necessary close contact between the rules 18 and 10 the latter may be furnished with a guide-bar 22, between which and the rule 10 the rule 18 slides as shown in the drawing.

In the form shown the indicator 5 is furnished with a slot 23 guiding a tube 24, extending downward from the sleeve 20. Through this arrangement the rule 18 is displaced automatically at the adjustment of the indicator 5 and the disk 4; thus it will be possible to read off directly at the intersection G between the scale-edges of the rules 10 and 18.

In order to obtain a registration of the course of the object D in the horizontal plane the tube 24 may embrace a holder 25 of a lead-pencil or drawing-pen 26 which at the displacement of the tube 24 in the slot 23 on the horizontal plate 27, representing for instance the map of the country around on the scale of 1 to 10000, shows the horizontal movement of the object D. For the purpose of determining in a simple way the speed of the object in relation to the horizontal plane the pencil 26 for each second or another suitable unit of time, should be lifted up from the plate 27 temporarily. In consequence, every time the pencil is lifted up the drawn curve will be interrupted.

For this purpose the holder 25 of the pencil 26 is attached to one arm 28 of a bell-crank 30, made to turn on the pivot 29. The other arm 31 of the bell-crank is influenced by a pin 32, which is given a motion forward and back by a clockwork 33, placed on the rule 18. By pressing out the pin 32 the pencil 26 through this arrangement is for a moment lifted up from the plate 27 so that the interruption of the horizontal curve is obtained and by means of a rule, a pair of dividers or another measuring-instrument adapted to the scale used it will be possible to read off the horizontal speed immediately.

In a similar way the vertical movement of the object may also be registered on the ranging-disk 4. In the form shown in Figs. 6–9 this last mentioned registration is obtained by providing the rules 10 and 18 with longitudinal slots 34, 35, in the intersection of which a drawing-pencil or the like 36 is to be placed. The drawing-pencil is suitably provided with a head 37 (Fig. 9), with a groove 38 inclosing a weighted string 39 attached to the top of the rule 18 so that the drawing-pencil is kept in its position, at the same time pressing on the ranging-disk 4 which for the purpose of getting the curve traced exactly ought to be covered with a sheet of drawing-paper or the like.

As appears from the Figs. 1–2 and 6 the ranging-disk 4 is also provided with parabolic curves 40, 41, 42, originating at the pivot 12 of the rule 10. By means of these curves it will be possible to direct or adjust a gun, mounted in the point A so that the object D will be hit by the projectiles. On regarding the Fig. 1 for instance it will appear that the point G (the object) lies, practically, on the curve 42. If this curve is followed back to its origin, the tangent of the parabolic curve in the last mentioned point shows the elevation the gun required to hit the object D. Further the time which the projectile requires to make its way to the object may easily be determined by means of the before obtained distances to the object, and thus the timing is given. To simplify the calculations timing-figures may be placed, at certain distances, in the curves on the ranging-disk. These timing-figures, of course, as well as the parabolic curves are applicable only to a special type of projectiles, and therefore the ranging-disk 4 must be changed for another disk provided with other parabolic curves if the projectile-type is changed. In Fig. 6 the same timing-figures on the different curves are connected by curves 43.

Figure 12:
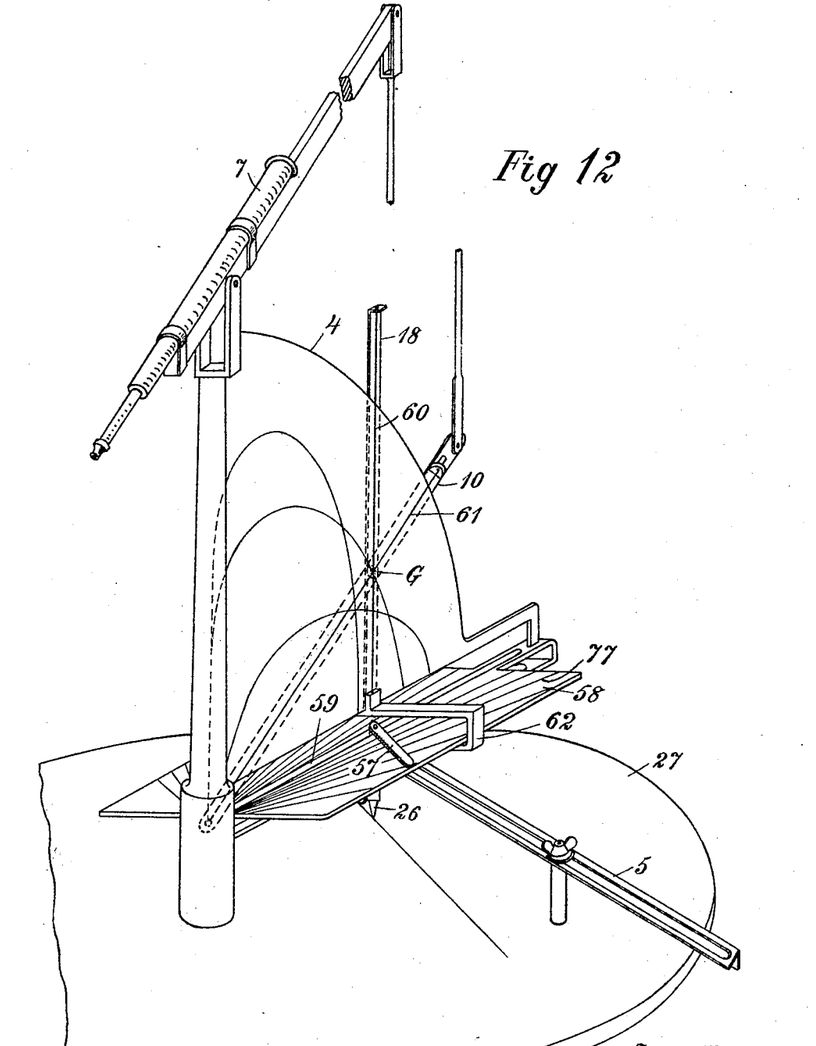
Fig. 12 is a perspective view of the main-apparatus provided with a device for determining the angular side-deviation of the object in the air during the shooting time.

When the object to be fired at is moving, as usually is the case, it will be necessary also to determine its angular lateral movement during the shooting time in order to be able to point the gun in such a direction that the shot really hits the object. This angular deviation may be determined by observing the angular velocity of the ranging-disk for instance by reading off the angle inclosing a number of the second-dashes made by the pencil 26 on the horizontal plate 27, and forming a part of the curve or straight line corresponding to the movement of the object. As an observation of this kind, however, must be more or less uncertain the apparatus according to the present invention is provided with a device by means of which this angle may be obtained conveniently. This device is illustrated in Figs. 12–19. The tube 24 carrying the pencil 26 supports at its upper end a small rule or the like 57 which travels over a plate 58 arranged between the lower horizontal edge of the ranging-disk 4 and the plate 27 in such a way that it takes part in the movements of the ranging-disk. The plate 58 is provided with a slot 59 along its center line in which the upper end of the pencil holder can slide freely when the rule 18 travels over the disk 4. In Fig. 12 the rules 18 and 10 are shown on the back side of the ranging-disk and each of them is provided with a fine thread or the like on the front side of the ranging-disk. The intersection of these threads 60 and 61 determines the point G representing the object in the air in the same way as the edges of the rules 18 and 10 in Fig. 6. In order to make it possible for the small rule 57 to travel over the plate 58 on both sides of the ranging-disk 4 the rule 18 is bent around the edges of the plate 58 as shown at 62 in Fig. 12. The pencil holder 24 is also connected with a frame 63 carrying a toothed wheel 64 trailing on the plate 27 behind the pencil and thus turning the tube 24 in such a way that the rule 57, which is placed opposite to said trailing wheel, always indicates the moving direction of the object D. For this purpose it is to be understood that the trailing wheel 64 is mounted a short distance from the point of the pencil 26.

Figure 13:
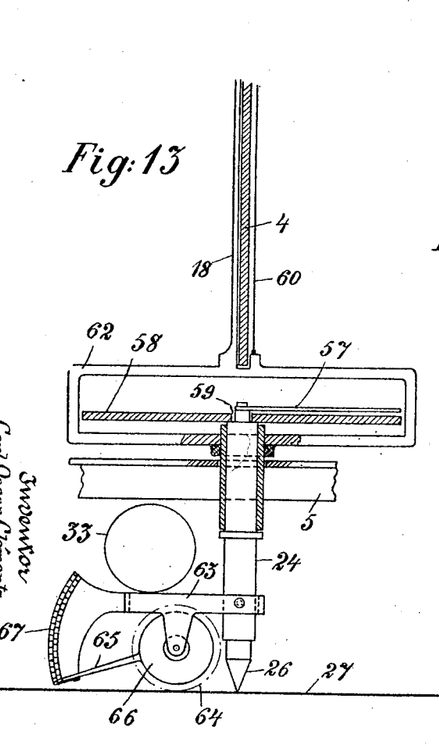
Fig. 13 is a cross section of said device together with a side view of a drawing pen and a speed recorder.
Figures 14, 15, 16:
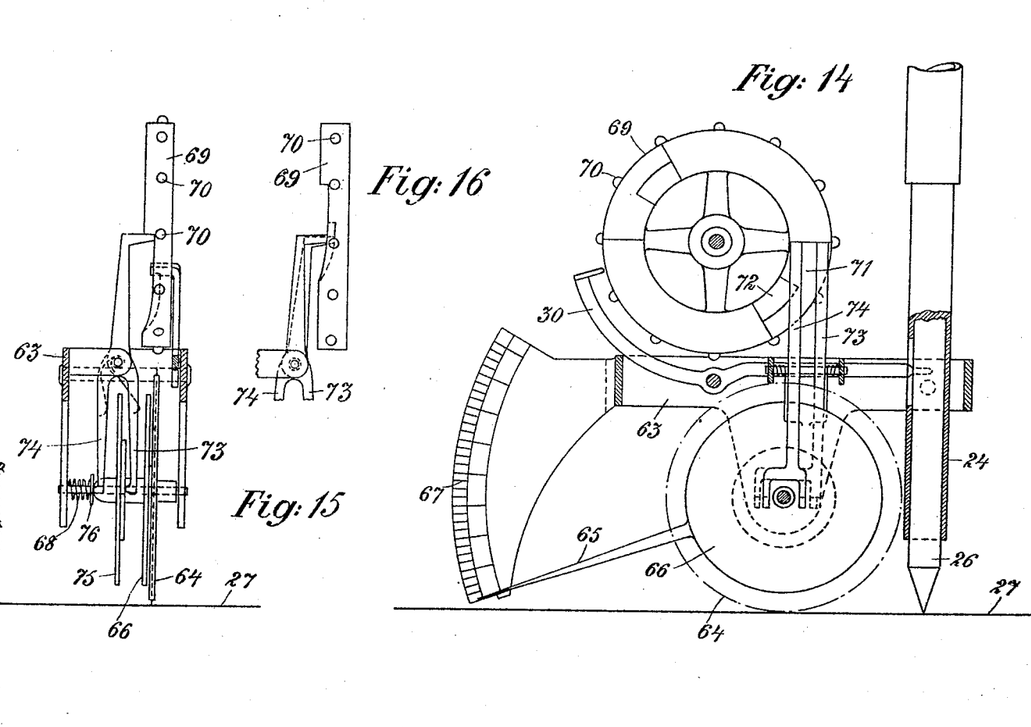
Fig. 14 is an enlarged partly sectional side view of the latter.
Figure 18:
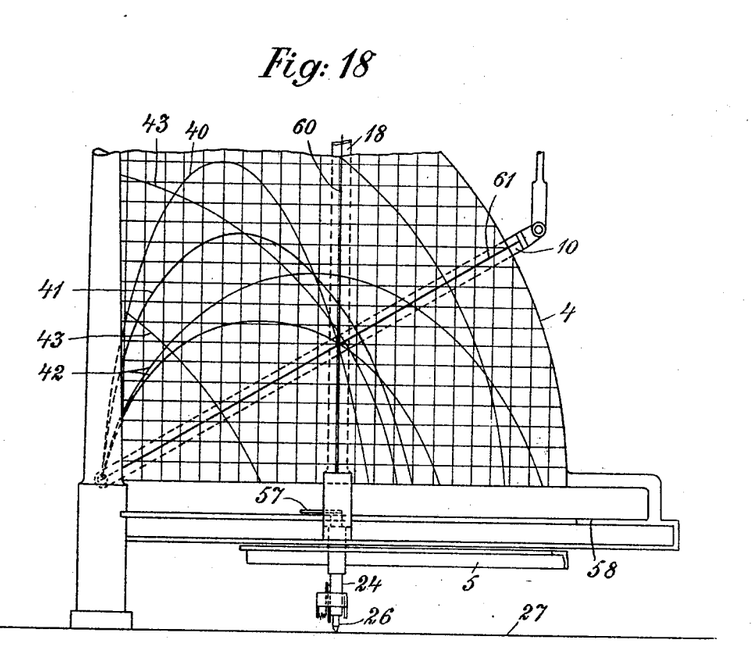
Fig. 18 is a fragmentary side elevation of the main-apparatus as shown in Fig. 12.
Figure 19:
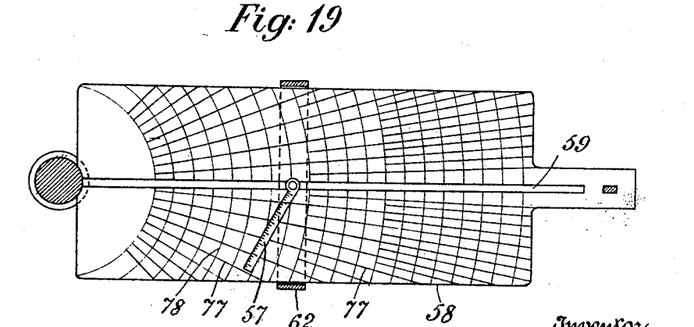
Fig. 19 is a plan view of the device for determining the angular side-deviation after the horizontal velocity of the object has been read off on the speed recorder.

The clockwork 33 is here placed on the frame 63 of the trailing wheel 64. A pointer 65 extending from a circular plate or ring 66 is mounted at one side of the wheel 64 and the sides of the wheel and the plate 66 facing each other are rough. When the pointer 65 is pressed against the wheel 64 the pointer will take part in the rotation of the wheel on account of the friction, and traveling over a scale 67 will indicate the distance covered by the trailing wheel and thus the speed of the object D. The pointer 65 is pressed against the wheel by means of a spring arrangement 68 and the pressure is applied in or near the center of the wheel. The pressure is interrupted at intervals in harmony with the lever arrangement 30 as for instance in the way explained below. When the friction is interrupted the pointer 65 falls down to zero by its own weight. The intervals between the breaking off of the friction ought not to be too short. The wheel 69 provided with teeth 70 which are placed a distance from each other for instance corresponding to one second is in one of its sides provided with recesses 71, 72 each of which coacts with a lever 73, 74. These levers are pivoted on the frame 63 and acted upon by springs tending to press the upper ends of the levers toward the wheel 69. Each of the lower ends of the levers acts upon a plate 75, 76 the former of these plates 75 being firmly connected with the plate 66 and the other one 76 being acted upon by the spring 68. The recesses 71, 72 are so arranged that, when the levers during the rotation of the wheel 69 have fallen into them and disengaged the pointer 65 from the wheel 64 thereby locking the same between the lever 73 and the plate 76, the recess 71 again moves the lever 73 backward from the plate 75 after for instance a second, while the recess 72 by means of an extra recess allows the lever 74 after this second has passed to move the plate 76 farther toward the spring 68 in such a way that the plate 66 is disengaged from the pressure of the spring 68. Thus, when the recess 71 after the first second commences to raise and to move the lever 73 back to its starting position, the pointer 65 is disengaged so that it can fall back to zero. Then the recess 72 presses the lever 74 back so that the plate 76 acted upon by the spring can press the plate 66 to the wheel 64.

After the horizontal velocity of the object having been read off and found to be for instance $n$ meters per second and its distance counted in shooting time $m$ seconds, it is evident that the object travels a distance of $m \times n$ meters in the horizontal plane during these $m$ seconds. Supposing that the object maintains its direction and velocity it will, of course, be easy to determine its position over the horizontal plane after the lapse of the shooting time, i. e. after $m$ seconds. The distance passed is read off on the rule 57 which also indicates the direction. When the point where the object is to be found after these $m$ seconds in this way has been determined the angle of deviation is approximately determined by a line on the plate 58 drawn from the center of rotation of the ranging-disk 4 through the said point. For this the vertical plane of the ranging-disk is always to be considered as zero-direction. As evidently the angle of deviation thus determined increases and decreases very slowly, at least when the horizontal distance of the object is relatively considerable, a gun kept in a position of readiness easily may be fired off in the right moment. In order to facilitate the reading, lines 77 (Fig. 19) directly indicating these angular deviations are drawn radially from the center of rotation of the ranging-disk on the plate 58, and for the purpose of adapting the elevation of the gun and its adjustment to the corrected position of the object D after the shooting time the plate 58 is provided with a number of circles 78 having their centers in the center of rotation of the ranging-disk 4. The point where the scale of the rule 57 intersects the angular deviation line on the plate 58 is traced along the corresponding circle 78 to the lower edge of the ranging-disk and thus the point where a vertical line from here intersects one of the parabolic curves 40—42 in the same height is the point where the threads 60 and 61, i. e. the rules 10 and 18, cross each other indicates the parabolic curve to be used for the shot instead of the one obtained when the angular deviation is not taken into consideration, this on the presumption that the object D moves horizontally. At the point of intersection between the rules 10 and 18 indicates the direction of the movement in the vertical plane of the object D the gun may easily be directed even when the object rises or descends.

It is to be noted that the rule 10 should also be turnable downward under the horizontal position, to make it possible to measure distances to points under the horizontal plane in which the apparatus is mounted.

If desired it will, of course, be easy to effect interruption of the curve drawn on the vertical ranging-disk by the point of intersection between the rules 10 and 18 in the same way as of the horizontal curve drawn by the pencil 26.

The descending branches of the parabolic curves lying over the one that represents the widest range should be interrupted at the nearest underlying curve because of two curves meeting in the same point it is generally the one with the smallest angle of elevation that will be taken into consideration for the firing.

Practically it will sometimes prove more appropriate to place the graphic marks of the ranging-disk on a removable sheet of cardboard or the like.

It is evident that it is not necessary that the main apparatus and the auxiliary apparatus be in one and the same horizontal plane, and one auxiliary apparatus can be connected with several main apparatus by means of one and the same cable. In this case it is not necessary that all the apparatus are placed in the same vertical plane.

The auxiliary apparatus and the main apparatus may also be completed in such a way that each of them possesses the attributes of both apparatus.

Until now nothing has been said about how the indicator 5 should be brought into positions corresponding to those of the indicator 2. On firing at a relatively motionless object, or for instance a captive balloon, the position of the indicator 2 may suitably be telephoned to the point A, but this procedure will not be applicable when the object hase a somewhat great horizontal speed. In this case the indicator 5 must be adjusted quite automatically, and for this an electromagnetic adjusting-arrangement may be used, which for instance may consist of electromagnets placed in the stand 11 and arranged so that the indicator 2 of the auxiliary apparatus, traveling along a corresponding number of contacts, placed on the disk 3, and thereby acting as a switch, makes the current pass through the magnets of the main apparatus, which magnets correspond to the different contacts. In this way the indicator 5 is brought into motion at the same time as the indicator 2.

In Figs. 6, 7, 10 and 11 such an electromagnetic adjusting device is shown. It consists of a large number of magnets 44, placed closely together, in which the cores 45, at their tops and at their lower ends, run out in radial edges 46. The indicator 5 is carried by the axle 47 which is mounted in a bearing 48 in the stand 11, and under the indicator 5 connected with a system of spokes the free ends of which are formed into forks 49 provided with radial edges 50, corresponding to the edges 46. These forks serve as armature for the electro-magnets and put the system of spokes and thereby the indicator 5 into rotation when the current is made to pass through the magnets successively. For the purpose of putting together a sufficient number of electro-magnets, they must be placed so that the diameters of the bobbins should not be determinative of the minimum-distance between the cores peripherically, and this is obtained by arranging the cores side by side and also displaced for instance in radial direction, and for the purpose of suspending the electro-magnets two concentric rings 51 and 52 and a series of walls 53 placed between these rings may be used, in which walls the different electro-magnets are suspended for instance by means of journals 54, inserted into holes made for this purpose in the walls 53.

Of course the different magnet coils may be connected with the corresponding contacts of the auxiliary apparatus by means of a special wire for each coil. But, practically and economically, this will be rather disadvantageous. For the purpose of gaining a greater turning power several electromagnets on this angular distance are connected in parallel or in series to one and the same wire, thus causing all the spokes to be attracted simultaneously and also bringing about a reduction of the number of wires required between the main-apparatus and the auxiliary apparatus. Electromagnets connected in such a way must, of course, be connected with corresponding points of contacts in the auxiliary apparatus. For instance every tenth electromagnet may be connected with the auxiliary apparatus by one and the same wire without any unfavorable influence on the movement of the indicator 5; this kind of connection is supposed to exist in Fig. 6 and, for the connection of the different magnet coils into the 10 groups, bus-bars 55 are used from which the connecting-wires, united to a cable 56 are led out, as will easily be understood.

It is evident that the angular movement of the spoke wheel may be made more sensible by grouping the magnets otherwise thus insuring more accuracy in measuring, and instead of having the spoke wheel to turn the indicator directly, as supposed above, this can be effected by gear systems arranged with the same ratio of gearing in the main-apparatus as in the auxiliary apparatus.

When it is desired only to determine the real position of an object or its projection on a horizontal plane the ranging disk can be discarded. At last it is to be understood that the details of the invention can vary within wide limits without departing from the scope of the invention.

Having thus fully set forth my invention, what I claim and desire to secure by Letters Patent, is:—

1. An apparatus of the character described comprising an indicator, a horizontal graduated disk over which the indicator travels, a vertical ranging disk which crosses over the indicator, a vertical pivotal support for the ranging disk, a sighting instrument and a rule movable parallel with the ranging disk, an auxiliary sighting instrument provided with an indicator, a horizontal graduated disk over which the last mentioned indicator travels, and means for imparting the movement of said latter indicator synchronously to the indicator crossing the ranging disk.

2. An apparatus of the character described comprising a horizontal graduated disk, an indicator movable over said disk, a quadrant forming a ranging disk, said quadrant extending over the indicator, pivotal means coincident with the vertical edge of the quadrant for mounting the latter, a sighting instrument and a rule connected with said ranging disk, an auxiliary sighting instrument, a horizontal graduated disk, an indicator on the auxiliary sighting instrument, the latter indicator being movable over the horizontal graduated disk and means for imparting the movement of said latter indicator synchronously to the indicator crossing the ranging disk.

3. An apparatus of the character described comprising an indicator, a horizontal graduated disk over which the indicator moves, a pivotal support, a ranging disk mounted on the pivotal support and provided with horizontal and vertical lines and extending over the indicator, a sighting instrument connected with a rule movable over the ranging disk, an auxiliary sighting instrument provided with an indicator, a horizontal graduated disk over which the latter indicator moves, and means for imparting the movement of said last mentioned indicator synchronously to the indicator over which the ranging disk extends.

4. An apparatus of the character described comprising an indicator, a horizontal graduated disk over which the indicator moves, a vertical ranging disk, a vertical rule slidably connected with the disk and indicator, whereby the rule is guided by the indicator, a sighting instrument, a rule connected with the sighting instrument and the ranging disk, a vertical axle on which the ranging disk is mounted, an auxiliary sighting instrument, an indicator for the auxiliary sighting instrument, a horizontal disk over which the latter indicator moves and means for imparting the movement of said latter indicator synchronously to the indicator connected with the vertical rule.

5. An apparatus of the character described comprising an indicator, a horizontal graduated disk over which the indicator moves, a vertical ranging disk, a vertical pivot for the ranging disk, the said ranging disk having a number of parabolic curves for determining the elevation of a gun, said curves originating at the intersection of the vertical axis of the ranging disk, a rule supported on the vertical pivot and vertically slidable over the ranging disk, a sighting instrument connected with said rule, means for mounting the sighting instrument on the vertical pivot, an auxiliary sighting instrument provided with an indicator, a horizontal graduated disk over which the latter indicator moves and means for imparting the movement of said latter indicator synchronously to the indicator coacting with the ranging disk.

6. An apparatus of the character described comprising a horizontal graduated disk, a vertical ranging disk provided with a plurality of parabolic curves intersected by a plurality of other curves connecting such joints on the parabolic curves as represent equal shooting times, an indicator movable over said graduated disk and coacting with said ranging disk, a rule movable over said ranging disk and rotatable therewith, a sighting instrument carried by said rule, an auxiliary sighting instrument having an indicator, a graduated disk over which said latter indicator moves, and means imparting the movement of said latter indicator synchronously to the indicator coacting with the ranging disk.

7. An apparatus of the character described comprising a horizontal graduated disk, a vertical ranging disk, a sliding vertical rule connected to said vertical ranging disk, an indicator movable over said graduated disk and engaging said sliding vertical rule, a marking instrument carried by said vertical rule, a horizontal plate supported beneath said ranging disk with its surface in contact with said marking instrument, a second rule movable over said ranging disk and rotatable on a vertical axis therewith, a sighting instrument carried by said second rule, an auxiliary sighting instrument having an indicator, a graduated disk beneath said indicator, and means for imparting the movement of the latter indicator synchronously to the indicator connected with the sliding vertical rule.

8. An apparatus of the character described comprising a graduated disk, a vertical ranging disk, a sliding vertical rule connected to said vertical ranging disk, an indicator movable over said graduated disk and connected to said sliding vertical rule, a marking instrument carried by said vertical rule, a horizontal plate beneath the ranging disk with its surface engaging the marking instrument, means controlling the periods of engagement between the marking instrument and horizotal plate, a secod rule adjustable on said ranging disk and rotatable on a vertical axis therewith, an auxiliary sighting instrument having an indicator, a graduated disk beneath said indicator, and means for imparting the movement of the latter indicator synchronously to the indicator connected with the slidable vertical rule.

9. An apparatus of the character described comprising a graduated disk, a rotatable ranging disk, a slidable rule connected thereto, an indicator simultaneously coacting with said ranging disk and said slidable rule, a second rule movable over said ranging disk and rotatable on a common axis therewith, a sighting instrument supported by said second rule, a marking instrument placed in the intersection between the rules with its point directed toward the ranging disk, an auxiliary sighting instrument having an indicator, a graduated plane disk adjacent said indicator, and means for imparting the movement of said last mentioned indicator synchronously to the indicator connected with the slidable rule.

10. An apparatus of the character described comprising a graduated disk, a vertical ranging disk, a slidable vertical rule connected with the ranging disk, an indicator movable over said graduated disk and imparting a horizontal sliding movement to the vertical rule along the ranging disk, a time controlled marking instrument, carried by said vertical rule, means connected with the marking instrument for indicating the velocity and direction of an object in the air, means for indicating the angular side deviation of an object in the air during the shooting time, a sighting instrument connected with the ranging disk, an auxiliary sighting instrument having an indicator, and means for imparting the movement of said latter indicator synchronously to the indicator coacting with the vertical rule.

11. An apparatus of the character described comprising a graduated disk, a ranging disk, a slidable vertical rule connected with said ranging disk, an indicator connected to said slidable rule for movement thereof horizontally along said ranging disk, a time controlled marking instrument carried by said vertical rule, a trailing wheel supported adjacent said marking instrument and guided thereby, a scale supported adjacent said trailing wheel, a speed indicator supported adjacent said scale, a direction indicator controlled by said trailing wheel, a scale adjacent said direction indicator, a sighting instrument connected with the ranging disk, an auxiliary sighting instrument having an indicator, and means for imparting the movement of said indicator synchronously to the indicator coacting with the slidable vertical rule.

12. An apparatus of the character described comprising, a graduated disk, a ranging disk, a slidable rule coacting therewith, an indicator movable over said graduated disk and adapted to move said slidable rule horizontally along the ranging disk during its movement over the graduated disk, a marking instrument carried by said slidable rule, a clock mechanism controlling the operation of the marking instrument, a trailing wheel connected with said marking instrument, an indicator manipulated by said trailing wheel, a scale supported adjacent said indicator, means simultaneously interrupting the movements of the indicator by said trailing wheel and governing its retention in its advanced position, a sighting instrument connected with the ranging disk, an auxiliary sighting instrument having an indicator thereon, and means for imparting the movement of said latter indicator synchronously to the indicator coacting with the slidable rule.

13. In an apparatus of the character described a graduated disk, a ranging disk, a horizontally slidable rule coacting with said ranging disk, an indicator controlling the movement of said rule, a second rule movable over said ranging disk and rotatable on a vertical axis therewith, a horizontal plate having circles concentric to the axis of said ranging disk and radial lines directed therefrom, a movable rule traversing the marked side of said plate, a trailing wheel controlling the movement of said latter rule, an auxiliary sighting instrument having an indicator, and means for imparting the movement of said latter indicator synchronously to the indicator coacting with the vertical rule.

14. An apparatus of the character described comprising a graduated disk, an indicator adjacent thereto, a sighting instrument rotatable on a vertical axis, an auxiliary sighting instrument comprising an indicator, a graduated disk adjacent to said latter indicator, and means for imparting the movement of said latter indicator synchronously to the first mentioned indicator.

15. An apparatus of the character described comprising a graduated disk, a vertical ranging disk, an indicator simultaneously coacting with said disks, a sighting instrument movable over said ranging disk and rotatable on a common vertical axis therewith, an auxiliary sighting instrument having an indicator, a horizontal graduated disk, a wheel secured to said first mentioned indicator, a plurality of armatures carried by said wheel, a plurality of electromagnets coacting with said armatures to move said wheel, contacts carried by said auxiliary sighting instrument and an electric conduit connecting said contacts with said electromagnets upon the adjustment of the auxiliary sighting instrument.

16. An apparatus of the character described comprising a ranging disk, a sighting instrument carried thereby, rules coacting with said ranging disk, an indicator coacting with said ranging disk and rules, an auxiliary sighting instrument having an indicator, and means imparting the movement of said latter indicator synchronously to the former indicator.

17. An apparatus of the character described comprising a graduated plate, an indicator co-acting therewith, a ranging disk, a rule movable by said indicator and coacting with said ranging disk, a second rule coacting with said ranging disk and movable thereover, a sighting instrument adjacent said ranging disk, an auxiliary sighting instrument having an indicator and means for moving said indicators in unison.

18. An apparatus of the character described comprising a sighting instrument, a range indicator coacting therewith, a direction indicator connected with the sighting instrument to be moved thereby, means timing the deviation in the course of a moving object, and operated by the movement of the sighting instrument, an auxiliary sighting instrument having an indicator, and means reproducing the position of the latter indicator on the range indicator.

19. Apparatus of the character described comprising an indicator, a graduated horizontal disk over which the indicator travels, a vertical ranging disk adapted to cross over the indicator, means to pivotally support the vertical ranging disk so that it can swing in a horizontal plane, a sighting instrument and rule movable parallel with the ranging disk, and means to angularly adjust the indicator.

20. Apparatus of the character described comprising a substantially horizontal graduated disk, an indicator arranged near and upon one side of the disk to be angularly adjusted with relation thereto, a horizontally swinging substantially vertical ranging disk disposed near the indicator and adapted to cross over the same, and a sighting instrument and rule movable substantially parallel with the ranging disk.

21. Apparatus of the character described comprising a graduated disk, an indicator movable in proximity to the disk, a substantially vertical ranging disk disposed near the indicator to co-act therewith, and a sighting instrument and rule connected with said ranging disk.

22. Apparatus of the character described comprising a graduated disk, an indicator movable in proximity to the graduated disk, a substantially vertical horizontally swinging ranging disk disposed near the indicator to extend over the same and having horizontal and vertical lines, a rule movable in proximity to the ranging disk, and a sighting instrument connected with the rule.

23. Apparatus of the character described comprising a graduated disk, an indicator movable in proximity thereto, a substantially vertical support, a substantially vertical ranging disk pivotally connected with the support to swing horizontally, a vertical rule connected with the disk and indicator and adapted to be guided by the indicator, a sighting instrument, and a second rule disposed for movement in proximity with the ranging disk and connected with the sighting instrument.

24. Apparatus of the character described comprising an indicator device, a vertical horizontally swinging ranging disk having a number of parabolic curves for determining the elevation of a gun, a vertically swinging rule disposed near the side of the ranging disk to co-act therewith, and a sighting instrument connected with the rule.

25. Apparatus of the character described comprising a graduated disk, an indicator movable in proximity to the graduated disk, a vertical ranging disk arranged near the indicator and co-acting therewith, said ranging disk having a plurality of parabolic curves intersected by a plurality of other curves connecting such points on the parabolic curve as represent shooting time, a rule movable in proximity to the ranging disk, and a sighting instrument connected with the rule.

26. Apparatus of the character described comprising a graduated horizontal disk, a vertical horizontally swinging ranging disk, a vertical horizontally movable rule connected with the ranging disk to be shifted with relation thereto, an indicator movable in proximity to the graduated horizontal disk and having connection with the vertical rule, a marking instrument connected with the vertical rule, a horizontal plate disposed beneath the ranging disk to contact with the marking instrument, an angularly adjustable rule connected with the ranging disk and movable with relation thereto, and a sighting instrument connected with the angularly adjustable rule.

27. Apparatus of the character described comprising a graduated horizontal disk, a vertical horizontally swinging ranging disk, a vertical horizontally movable rule connected with the ranging disk to be shifted with relation thereto, an indicator movable in proximity to the graduated horizontal disk and having connection with the vertical rule, a marking instrument connected with the vertical rule a horizontal plate disposed beneath the marking instrument to contact therewith, means controlling the period of contact between the marking instrument and horizontal plate, an angularly adjustable rule connected with the ranging disk, and a sighting instrument connected with the angularly adjustable rule.

28. Apparatus of the character described comprising a graduated disk, a ranging disk, a horizontally movable rule co-acting with the ranging disk, an indicator co-acting with the graduated disk and connected with the horizontally movable rule to control its movement, an angularly adjustable rule connected with the ranging disk, a sighting instrument connected with the angularly adjustable rule, a horizontal plate having circles concentric to the axis of the ranging disk and radial lines directed therefrom, a movable rule traversing the horizontal plate, and a trailing wheel controlling the movement of the last named rule.

29. Apparatus of the character described comprising a graduated disk, a vertical ranging disk having a vertical axis upon which it swings, an indicator simultaneously co-acting with both disks, and a sighting instrument disposed adjacent the ranging disk and rotatable on the vertical axis thereof.

30. Apparatus of the character described, comprising a horizontally swinging substantially vertical ranging disk, a vertically swinging rule arranged upon one side of the ranging disk to move in parallel relation thereto, a sighting instrument adapted for movement with the rule, and a substantially vertical rule arranged upon one side of the disk and adapted to be moved horizontally with relation thereto.

31. Apparatus of the character described, comprising a horizontally swinging substantially vertical ranging disk having a vertical axis, means for supporting the disk so that it can turn upon its vertical axis, an angularly adjustable rule arranged upon one side of the disk and movable in a vertical plane parallel with said disk, a sighting instrument associated with the rule, a substantially vertical rule disposed upon one side of the ranging disk and movable horizontally with relation thereto, and means to shift the substantially vertical rule toward and away from the vertical axis of said disk.

32. Apparatus of the character described comprising, a vertical horizontally swinging ranging disk, a vertical rule connected with the ranging disk and arranged upon one side thereof to be shifted horizontally with relation thereto, a marking instrument connected with the vertical rule, a horizontal plate arranged to contact with the marking instrument, an angularly adjustable rule arranged upon one side of the ranging disk and movable in a vertical plane with relation thereto, and a sighting instrument connected with the angularly adjustable rule.

33. Apparatus of the character described, comprising a vertical horizontally swinging ranging disk, a vertical rule connected with the ranging disk to be shifted horizontally with relation thereto, a marking instrument connected with the vertical rule, a horizontal plate disposed beneath the marking instrument to contact therewith, means for controlling the period of contact between the marking instrument and horizontal plate, an angularly adjustable rule arranged upon one side of the ranging disk, and a sighting instrument connected with the angularly adjustable rule.

In testimony whereof, I have signed my name to this specification in the presence of two subscribing witnesses.

CARL OSCAR CLÉMENTZ.

Witnesses:
A. W. ANDERSON,
FRED FLERON.